(12) United States Patent
Bauer et al.

(10) Patent No.: US 10,185,885 B2
(45) Date of Patent: Jan. 22, 2019

(54) TEX LINE DETECTION (71) Applicants: Hewlett-Packard Development Company, L.P., Houston, TX (US); PURDUE RESEARCH FOUNDATION, West Lafayette, IN (US)

(72) Inventors: Peter Bauer, Boise, ID (US); Yandong Guo, Boise, ID (US); Jan Allebach, West Lafayette, IN (US); Charles Bouman, West Lafayette, IN (US)

(73) Assignees: Hewlett-Packard Development Company, L.P., Houston, TX (US); Purdue Research Foundation, West Lafayette, IN (US)

(*) Notice: Subject to any disclaimer, the term of this patent is extended or adjusted under 35 U.S.C. 154(b) by 0 days.

(21) Appl. No.: 15/521,860

(22) PCT Filed: Oct. 31, 2014

(86) PCT No.: PCT/US2014/063495
§ 371 (c)(1),
(2) Date: Apr. 25, 2017

(87) PCT Pub. No.: WO2016/069005
PCT Pub. Date: May 6, 2016

(65) Prior Publication Data
US 2017/0262726 A1 Sep. 14, 2017

(51) Int. Cl.
*G06K 9/34* (2006.01)
*G06K 9/00* (2006.01)
*G06K 9/32* (2006.01)

(52) U.S. Cl.
CPC ......... *G06K 9/344* (2013.01); *G06K 9/00463* (2013.01); *G06K 9/3283* (2013.01); *G06K 2209/01* (2013.01)

(58) Field of Classification Search
CPC ..................... G06K 2209/01; G06K 9/344
See application file for complete search history.

(56) References Cited

U.S. PATENT DOCUMENTS 6,178,270 B1 * 1/2001 Taylor ................ G06K 9/2054
358/453
6,574,366 B1 6/2003 Fan
(Continued)

FOREIGN PATENT DOCUMENTS

EP 0881592 12/1998

OTHER PUBLICATIONS

Ouwayed, N. et al., "General Text Line Extraction Approach based on Locally Orientation Estimation," (Research Paper). ~ DRR 2010 ~ Jun. 1, 2010. 7 pages.
(Continued)

*Primary Examiner* — Phuoc Tran
(74) *Attorney, Agent, or Firm* — HP Inc. Patent Department (57) ABSTRACT

A system and method for text line detection are described Examples include detection of symbols in an image received from an image-capturing device. In examples, for each of at least some of the symbols, neighboring symbols within a local region a given distance from the symbol are analyzed in order to determine a direction for a line in the local region. In examples, based on the determined directions for the lines, text lines in the image are identified.

13 Claims, 9 Drawing Sheets

(56) References Cited

U.S. PATENT DOCUMENTS

| | | | |
|---|---|---|---|
| 6,687,421 B1 | 2/2004 | Navon | |
| 8,588,529 B2 | 11/2013 | Nykyforov | |
| 2009/0016606 A1 | 1/2009 | Meyer et al. | |
| 2009/0175537 A1* | 7/2009 | Tribelhorn | G06K 9/00463 382/173 |
| 2010/0008579 A1* | 1/2010 | Smirnov | G06K 9/00463 382/176 |
| 2014/0140635 A1* | 5/2014 | Wu | G06T 5/006 382/266 |
| 2014/0193029 A1 | 7/2014 | Vassilieva | |

OTHER PUBLICATIONS

Risnumawan, A. et al., "A Robust Arbitrary Text Detection System for Natural Scene Images," (Research Paper) ~ Science Direct, 2014, 22 pages.

Roy, P.P. et al., "Text Line Extraction in Graphical Documents Using Background and Foreground Information," (Research Paper), 2012, 32 pages.

Saabni, R. et al., "Text Line Extraction for Historical Document Images," (Research Paper) ~ Pattern Recognition Letters, Nov. 15, 2011, 42 pages.

\* cited by examiner

| Degree | Date | School |
|---|---|---|
| B.S.E.E. | May 1981 | University of Pennsylvania |
| M.S.E.E. | Sept. 1982 | University of California at Berkeley |
| M.A. | Jan. 1987 | Princeton University |
| Ph.D. | Oct. 1989 | Princeton University |
| Dissertation: Hierarchical Modeling and Processing of Images | | |

*this test*

*this is another test*

TEX LINE DETECTION

BACKGROUND

Image acquisition devices such as scanners can convert paper documents into image formats suitable for computers. The transformation of images to text may be accomplished by text processing units which perform operations of binarization, de-skew, layout analysis, and optical character recognition ("OCR").

DETAILED DESCRIPTION

Examples described herein include a text line detection system to detect lines of textual content in an image, whether scanned, taken by a camera, or created by other means.

In one aspect, a text line detection system performs operations that include detecting symbols in an image received from an image-capturing device. For each of at least some of the symbols, neighboring symbols within a local region a given distance from the symbol are analyzed in order to determine a direction for a line in the local region. Based on the determined directions for the lines, text lines in the image are identified.

In some aspects, determining the direction for the line in the local region for each of the symbols involves optimizing a cost function. The direction and position of local line candidates passing through the symbol at differing angles are modeled as input to a cost function, and the cost function is used to determine which of the local line candidates has the lowest cost. The cost function is designed such that the lowest cost local line candidate passes as many neighboring symbols as possible while also ensuring that the co-linearity of the neighboring symbols belong to the same text line in the local region. In some aspects, identifying text lines in the image based on the determined directions for the lines in local regions involves determining whether symbols belong on the same text line as their neighbors, which can be checked in three steps. First, that a symbol in question belongs to the line in the local region associated with its neighboring symbol. Second, that the neighboring symbol belongs to the line in the local region associated with the symbol in question. Third, that the two lines in the local regions meet at an angle below a specified threshold. Each of the symbols can be modeled as nodes in a graph where the edges are connected based on whether it was determined that each pair of symbols belongs on the same text line. Nodes that are reachable from each other can then be clustered together to form the text lines in the image. In addition, non-symbol content can be detected in the image, and once the text lines have been detected, the system can save a document with the detected text lines and the non-symbol content. In one aspect, the detected text lines comprise the symbols detected in the image reformatted into a selectable text format.

In further aspects, the image received from the image-capturing device is in a binary format with no renderable text, which can be vector (computer generated) text that is placed on top of an image layer. It can also be a natural scene that contains text in signage or on other physical structures in the scene. Furthermore, the image-capturing device can be a scanner, camera, or other similar device.

By estimating the direction of the text line within small local regions, the text line detection system is more robust and able to detect lines with non-uniform skewing. Unlike other methods, such as smearing, these local text line directions can be used in addition to the distance between symbols to produce more accurate results. Furthermore, local text line detection can be less computationally expensive and can be performed without the dynamic tuning of other methods.

The term "text line" and variants thereof refer to a set of symbols, such as alphanumeric characters, the centroids of which fall on a smooth curve. Text lines can be horizontal, vertical, or skewed at any angle.

One or more examples described herein provide that methods, techniques and actions performed by a computing device are performed programmatically, or as a computer-implemented method. Programmatically means through the use of code, or computer-executable instructions. A programmatically performed step may or may not be automatic.

System Overview

Figure 1:
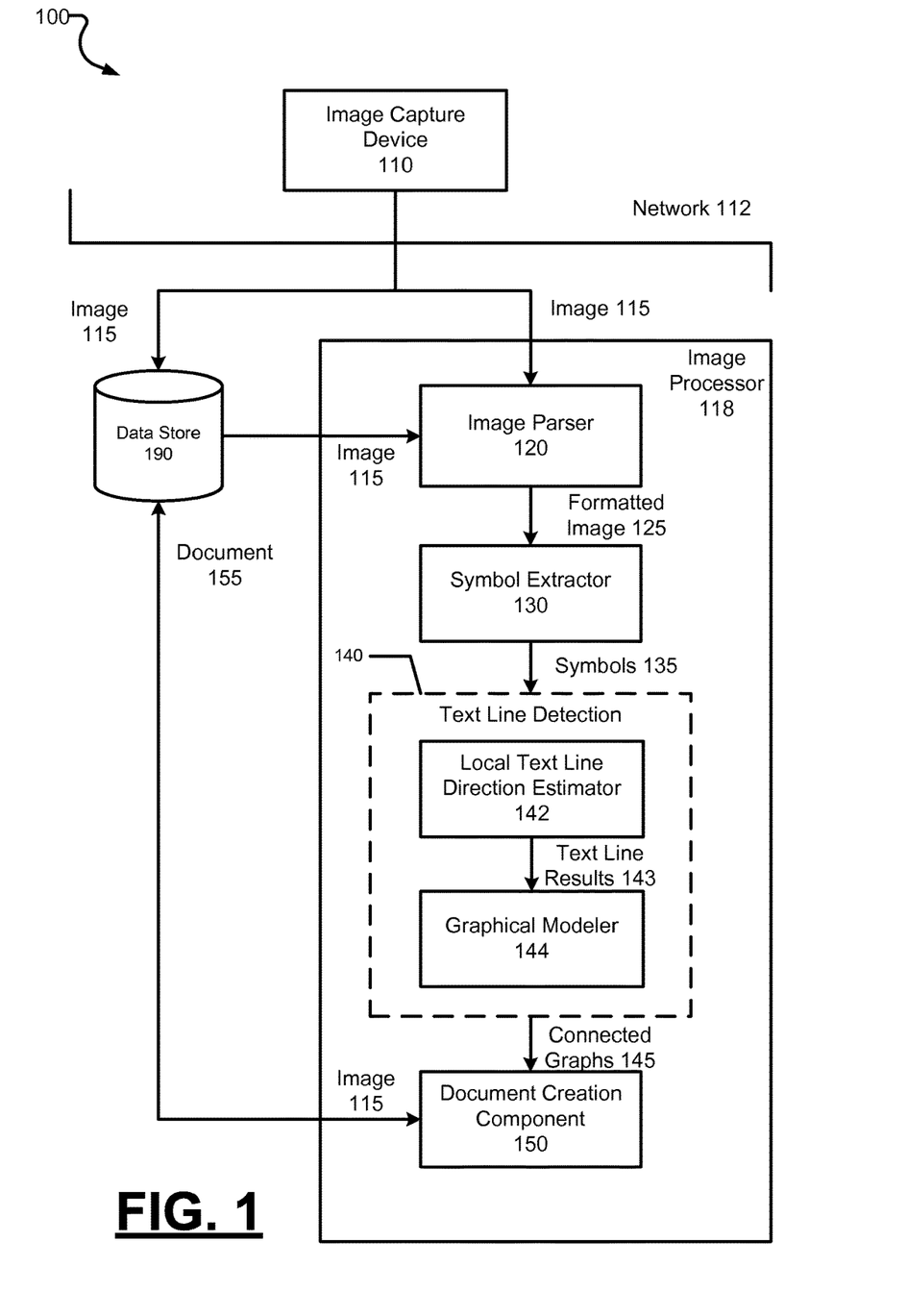
FIG. 1 illustrates an example computer system for implementing text line detection, in accordance with some aspects.

FIG. 1 illustrates an example computer system 100 for implementing text line detection, in accordance with some aspects. The computer system 100 includes at least an image capture device 110, image processor 118, image parser 120, symbol extractor 130, a text line detection 140, document creation component 150 and data store 190. In some aspects, the text line detection engine 140 can comprise two parts: a local text line direction estimator 142 and a graphical modeler 144.

Image processor 118, image parser 120, symbol extractor 130, a text line detection 140, document creation component 150, local text line direction estimator 142 and graphical modeler 144 may be implemented using programmatic modules or components. A programmatic module or component may be any combination of hardware and programming capable of performing one or more stated tasks or functions. In addition, a module or component can exist on a hardware component independently of other modules or components. Alternatively, a module or component can be a shared element or process of other modules, programs or machines. Furthermore, one or more examples described herein may be implemented through the use of instructions that are executable by one or more processors. These instructions may be carried on a non-transitory computer-readable medium. Machines shown or described with figures below provide examples of processing resources and non-transitory computer-readable media on which instructions for implementing some aspects can be carried and/or executed. In particular, the numerous machines shown in some examples include processor(s) and various forms of memory for holding data and instructions. Examples of non-transitory computer-readable media include permanent memory storage devices, such as hard drives on personal computers or servers. Other examples of computer storage media include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on non-transitory computer-readable media. Alternatively, a computing device or one or more examples described herein may be implemented through the use of dedicated hardware logic circuits that are comprised of an interconnection of logic gates. Such circuits are typically designed using a hardware description language (HDL), such as Verilog and VHDL. These languages contain instructions that ultimately define the layout of the circuit. However, once the circuit is fabricated, there are no instructions. All the processing is performed by interconnected gates.

Image capture device 110 can be any device capable of creating digital images, such as a digital camera or image scanner. An image scanner, for example, can be a flatbed scanner that optically scans images (such as developed photographs from a film camera), printed text, handwriting, or objects and converts the input into a digital image. Hand-held and 3D scanners are also examples of an image capture device 110. Furthermore, image capture device 110 can be a component in a larger device, such as an all-in-one printer with a built-in scanner or a mobile phone with a digital camera and scanning feature.

After capturing an image 115, image capture device 110 can send the image 115 directly to image parser 120 as part of an image processor 118 or store the image 115 in data store 190 for later use. Thus, in one aspect, image parser 120 retrieves the image 115 from data store 190. In some examples, image 115 is transmitted over network 112. Image parser 120 takes the image 115, which can be in one of many file formats, and performs any decoding that is needed. For example, the image 115 may be in a compressed JPEG format which image parser 120 can read or possible convert to a bitmap for symbol extractor 130.

Symbol extractor 130 takes the formatted image 125 from image parser 120 and identifies symbols 135 present in the image. Some examples of images may be documents and notes containing substantially or even entirely symbols, but other examples may be photographs with only a few symbols, such as those displayed on signs in the photograph. In one aspect, a cost-optimized segmentation (COS) procedure is employed by the symbol extractor 130 to output a binary image with the text symbols 135 detected. However, other procedures and methods can be used to extract symbols 135.

Text line detection 140 receives the extracted symbols 135 from symbol extractor 140. In some aspects, text line detection 140 comprises two components, local text line direction estimator 142 and graphical modeler 144. Local line text direction estimator 142 can employ a local text line direction estimation procedure to determine a direction for a line in a local region for each symbol. Graphical modeler 144 can employ a graphical model-based text line construction procedure to build a graphical model with each of the symbols as a node in the graph. Graphical modeler 144 can then group the symbols into text lines by separating the graph into subgraphs based on the text line results 143 from the local text line direction estimator 142.

After the graphical model-based text line construction procedure is completed, connected graphs 145 can be sent to a document creation component 150. In one example, document creation component 150 can combine the image 115 and the detected text lines from the connected graphs 145 to create a document 155, such as a text file or an image file with renderable text. The document can, for example, be represented in the form of a page description language, such as PDF. This document 155 can then be saved in data store 190, which can represent a transient storage medium or permanent storage medium. For example, data store 190 may be random access memory (RAM) or a computer disk drive, solid state drive, flash memory, etc.

Methodology

Figure 2:
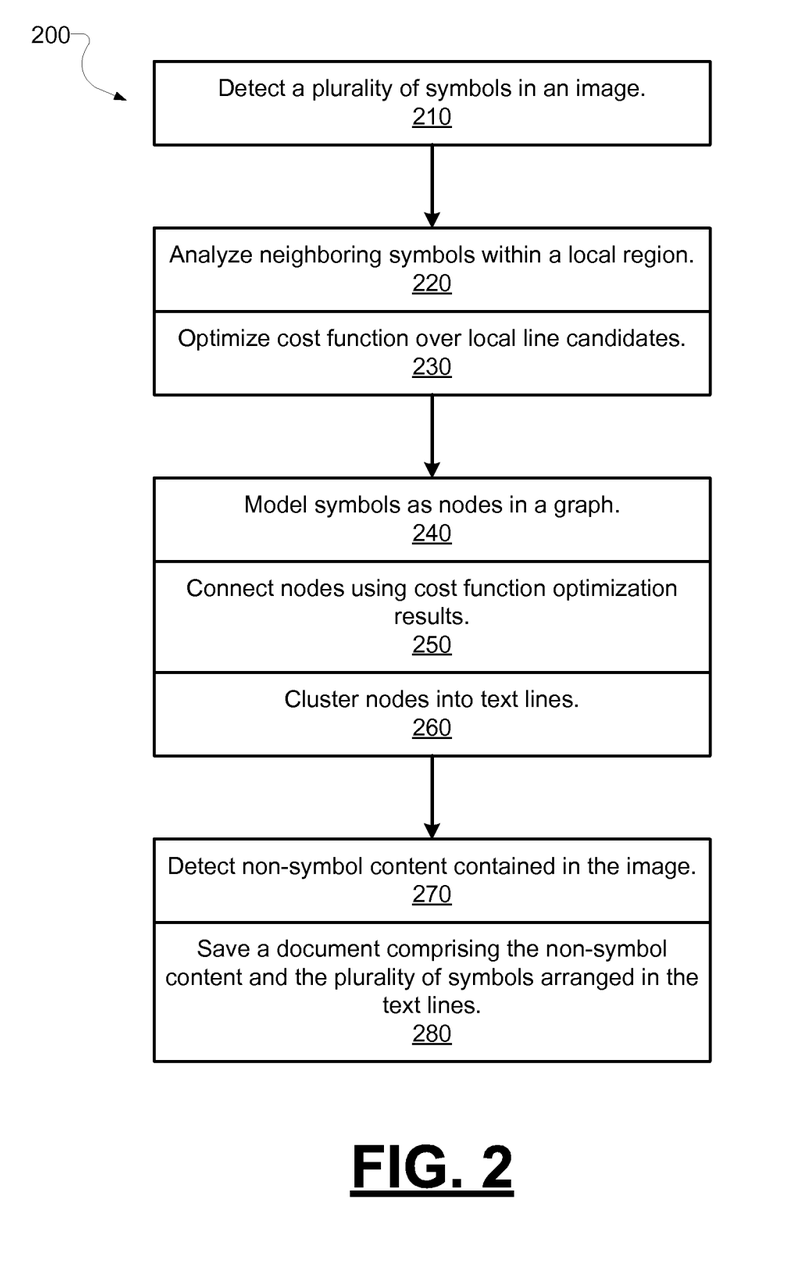
FIG. 2 illustrates a detailed example method for text line detection, in accordance with some aspects.

FIG. 2 illustrates a detailed example method for text line detection, in accordance with some aspects. While operations of the method 200 are described below as being performed by specific components, modules or systems of the computer system 100, these operations need not be performed by the specific components identified, and could be performed by a variety of components and modules, potentially distributed over a number of machines. Accordingly, references may be made to elements of system 100 for the purpose of illustrating suitable components or elements for performing a step or sub step being described. Alternatively, at least certain ones of the variety of components and modules described in system 100 can be arranged within a single hardware, software, or firmware component. In addition, some of the steps of this method may be performed in parallel or in a different order than illustrated.

With reference to an example of FIG. 2, text line detection is performed through, for example, a computer system 100 as described with FIG. 1. First, symbol extractor 130 detects N symbols from the image, denoted by $\{s_i\}_{i=1}^{N}$ (210). These symbols may be, for example, letters, numbers, and other characters used in text, whether in English or any other language. The centroid of the $i^{th}$ symbol is denoted by $x_i=(x_{i,1}, x_{i,2}, 1)^T$, where $x_{i,1}$ and $x_{i,2}$ are the symbol's horizontal and vertical coordinates, respectively. In one aspect, homogeneous coordinates are utilized to introduce compactness into the formulation, and the text line is constructed according to the geometric locations of the centroids of the symbols.

Although text lines in the image may contain non-uniform skew (that is, the text line may curve or change angles more than once), within a relatively small region, the centroids of the symbols in the same local area of the text line tend to fall on a straight line. Therefore, local text line direction estimator 142 separately estimates the directions of the text lines in different local regions representing portions of the image. In some aspects, local text line direction estimator 142 estimates directions of lines in the local region for each of the symbols in the image. For the $i^{th}$ symbol, a local region is defined centered at its centroid $x_i$. All the symbols in this local region are denoted by $s_{3i}$ as shown in the example local region 320 illustrated in FIG. 3.

Figure 3:
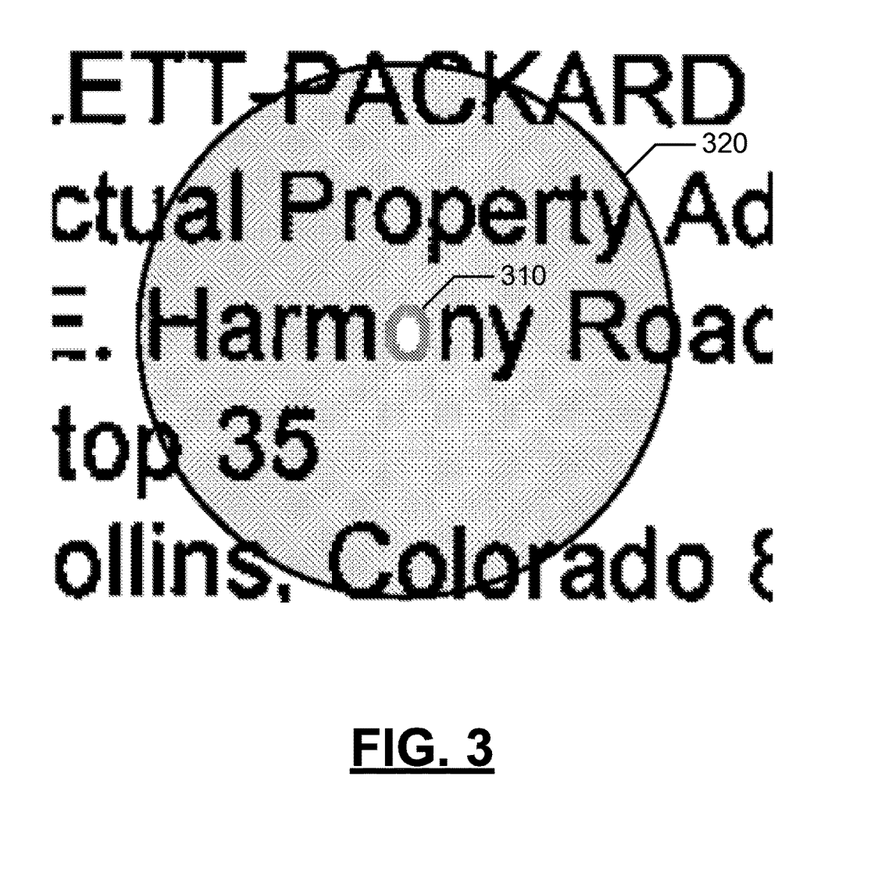
FIG. 3 illustrates an example of a local region centered on a symbol from an extracted image, in accordance with some aspects of text line detection.

In some aspects, the locations and coordinates of this set of neighboring symbols $s_{3i}$ is analyzed to determine a direction for a line in the local region 320 passing through the centroid of symbol $s_i$ (220).

In the local region centered at $x_i$, the direction of the text line containing $s_i$ is denoted as $\theta_i$, while the location of the text line is controlled by a scalar $\beta_{i,3}$. Following the homogenous coordinates used in the definition of $x_i$, a vector is defined:

$$\beta_i = [\cos\theta_i, \sin\theta_i, \beta_{i,3}]^T$$

With this homogenous framework, it can be shown that the distance between the centroid $x_j$ and the straight line represented by $\beta_i$ is $$d(x_j, \beta_i) = |\beta_i^T x_j|$$

In addition to the above observation on the local collinearity of symbol centroids, $\beta_i$ is estimated based on the observation that the symbol density is higher along the text line direction than the symbol density is in other directions. Since not all the symbols in $s_{\partial i}$ belong to the same text line, a binary variable $\lambda_{i,j}$ can be used to describe whether the $j^{th}$ symbol belongs to the text line in the local region containing the $i^{th}$ symbol.

$\lambda_{i,j} = 1$ when $s_j$ belongs to the text line in the local region containing $s_i$.

$\lambda_{i,j} = 0$ when $s_j$ does not belong to the text line in the local region containing $s_i$.

With the notation above, the following cost function can be used to estimate and $\lambda_i = \{\lambda_{i,j} | j \in \partial i\}$, $$\{\hat{\beta}_i, \hat{\lambda}_i\} = \underset{\beta_i, \lambda_i}{\mathrm{argmin}} \left\{ \sum_{j \in \partial i} \alpha_j |1 - \lambda_{i,j}| + d(x_i, \beta_i)^2 + \sum_{j \in \partial i} \lambda_{i,j} d(x_j, \beta_i)^2 \right\}$$

where the term $d(x_i, \beta_i)^2 + \sum_{j \in \partial i} \lambda_{i,j} d(x_j, \beta_i)^2$ accounts for the local collinearity assumption. During the optimization procedure, this term produces the estimation of $\beta_i$ by fitting a straight line onto the centroids of symbols with non-zero $\lambda_{i,j}$. Simultaneously, this term tends to prune out symbols from the local text line by encouraging $\lambda_{i,j}$ to be zero.

On the other hand, the penalty term $\sum_{j \in \partial i} \alpha_j |1 - \lambda_{i,j}|$ encourages the local text line to contain as many symbols as possible. Without this term, after the minimization, it is possible that none of the symbols in $s_{\partial i}$ are considered to be in the text line containing $s_i$ since purely minimizing the other term would make all the $\lambda_{i,j}$ terms equal to 0. The strength of the penalty term is controlled by the parameter $\alpha_j$, which, in some aspects, is designed to introduce geometric meaning to the cost function. Suppose the width and height of the $j^{th}$ symbol are denoted by $w_j$ and $h_j$, respectively. The parameter $\alpha_j$ can be calculated as $$\alpha_j = \left( \frac{\max\{\omega_j, h_j\}}{2} \right)^2$$

The way $\alpha_j$ is calculated has the following geometric interpretation. Calculating the partial derivative of the cost function according to $\lambda_{i,j}$ results in:

If $d(x_j, \beta_i) \leq \dfrac{\max\{\omega_j, h_j\}}{2}$, then $\lambda_{i,j} = 1$ If $d(x_j, \beta_i) \leq \dfrac{\max\{\omega_j, h_j\}}{2}$, then $\lambda_{i,j} = 0$ This result shows that if the straight line $\beta_i$ passes through the symbol $s_j$, $\lambda_{i,j} = 1$, which means that the location of the symbol $s_j$ contributes to the estimation of $\beta_i$. On the contrary, if the straight line $\beta_i$ does not cut through the symbol $s_j$, $\lambda_{i,j} = 0$, which means the symbol $s_j$ is not considered to belong to the text line with $s_i$, and the location of $s_j$ does not contribute to the estimation of $\beta_i$.

In some aspects, an alternating optimization scheme is designed to solve the cost function by fixing $\lambda_{i,j}$ and optimizing over $\beta_i$ (230).

The distance between the centroid of a symbol and the straight line (e.g., a local text line candidate) can be expressed as $$d(x_i, \beta_i) = \frac{|\beta_i^T x_i|}{\sqrt{\beta_{i,1}^2 + \beta_{i,2}^2}},$$

Letting X be the matrix for which the columns consist of $x_i$ and $$\lambda_{i,j} x_j, \hat{\beta}_i = \underset{\beta_i}{\mathrm{argmin}} \{ \beta_i^T X X^T \beta_i \}$$

subject to $\beta_{i,1}^2 + \beta_{i,2}^2 = 1$.

In one aspect, calculating $\beta_i$ is performed as follows:

$$R = XX^T$$

$$R = \begin{bmatrix} R_{1,1} & R_{1,2} & R_{1,3} \\ R_{2,1} & R_{2,2} & R_{2,3} \\ R_{3,1} & R_{3,2} & R_{3,3} \end{bmatrix} = \begin{bmatrix} \cos\theta & \sin\theta & 0 \\ -\sin\theta & \cos\theta & 0 \\ 0 & 0 & 1 \end{bmatrix} \times \begin{bmatrix} \tilde{R}_{1,1} & 0 & \tilde{R}_{1,3} \\ 0 & \tilde{R}_{2,2} & \tilde{R}_{2,3} \\ \tilde{R}_{3,1} & \tilde{R}_{3,2} & \tilde{R}_{3,3} \end{bmatrix} \times$$

$$\begin{bmatrix} \cos\theta & -\sin\theta & 0 \\ \sin\theta & \cos\theta & 0 \\ 0 & 0 & 1 \end{bmatrix}$$

$$\beta_i = k_1 \begin{bmatrix} \cos\theta \\ -\sin\theta \\ 0 \end{bmatrix} + k_2 \begin{bmatrix} \sin\theta \\ \cos\theta \\ 0 \end{bmatrix} + k_3 \begin{bmatrix} 0 \\ 0 \\ 1 \end{bmatrix}$$

In one aspect, the value of $\theta$ is gradually changed from 1 degree to 180 degrees. For each fixed $\beta_i = [\cos\theta_i, \sin\theta_i, \beta_{i,3}]^T$, the cost function is minimized over $\lambda_i$. After obtaining $\hat{\beta}_i$, the direction of the local text line containing the symbol can be calculated as $$\hat{\theta}_i = \arctan\frac{\hat{\beta}_{i,2}}{\hat{\beta}_{i,1}}.$$

After obtaining $\hat{\beta}_i$ and $\hat{\lambda}_i$, $i = 1, \ldots, N$, a graphical model $G = (V, E)$ can be used to cluster the symbols into text lines. Here, the terms V and E denote the set of nodes and the set of edges, respectively. Each of the symbols is considered as a node in the graph (240). For any two symbol nodes $s_i$ and $s_j$, the probability that the symbol nodes $s_i$ and $s_j$ belong to the same text line is calculated as $$p_{i,j} = \lambda_{i,j} \lambda_{j,i} \delta(\theta_i, \theta_j)$$

In some aspects, $\delta(\theta_i, \theta_j)$ has a binary output:

$$\delta(\theta_i, \theta_j) = 1, \text{ if } |\theta_i - \theta_j| \leq \theta_{max}$$

$$= 0, \text{ otherwise.}$$

In one aspect, $\theta_{max}$ is set to $\pi/6$, or 30 degrees. In this aspect, two symbol nodes are connected if the probability is 1 and not connected if the probability is 0 because all three terms are binary variables (250). Specifically, two symbol nodes are connected if the following are true: first, one symbol belongs to the line in the local region associated with its neighboring symbol. Second, the neighboring symbol belongs to the line in the local region associated with the symbol in question. Third, the two lines in the local regions meet at an angle below a specified threshold $\theta_{max}$.

Alternatively, in other aspects, a continuous output model for $\delta(\theta_i, \theta_j)$ with a more sophisticated graph interference method such as loopy belief propagation or expectation propagation can be used, although these other methods may have greater computation costs.

With the graph constructed, text lines can be constructed using the following method of operation. In some aspects, first, all symbol nodes are marked as unclustered. Second, any unclustered symbol node in the graph is chosen as the source node. From the source node, all reachable symbol nodes are found, for example, by using a breadth-first search. These reachable symbol nodes and the source symbol node are considered to belong to the same text line. These symbols are marked as clustered, and the process is repeated until all symbols are clustered (260).

In addition, non-symbol content can be detected in the image (270), and once the text lines have been detected, document creation component 150 can save a document with the detected text lines and the non-symbol content (280). In one aspect, the detected text lines comprise the symbols detected in the image reformatted into a selectable text format.

Example Local Region

FIG. 3 illustrates an example of a local region 320 centered on a symbol from an extracted image, in accordance with some aspects of text line detection. In this example, a portion of an image from a larger scanned document is reproduced.

For each given symbol $s_i$, e.g. the letter "o" 310 in the center of FIG. 3, a small region 320 is defined fixed at the centroid of the symbol. In this example, the region 320 is a circle. The local direction of the text line containing $s_i$ is estimated according to the location of the symbols $s_i$ and $s_{\partial i}$ in the local region 320. Here, the term $\partial_i$ denotes the indexes of the symbols within the local region 320 centered at the centroid of $s_i$. As shown in FIG. 3, the set of neighboring symbols $s_{\partial i}$ are at least partially within the shaded circle.

Example Lines in the Local Region

Figure 4A:
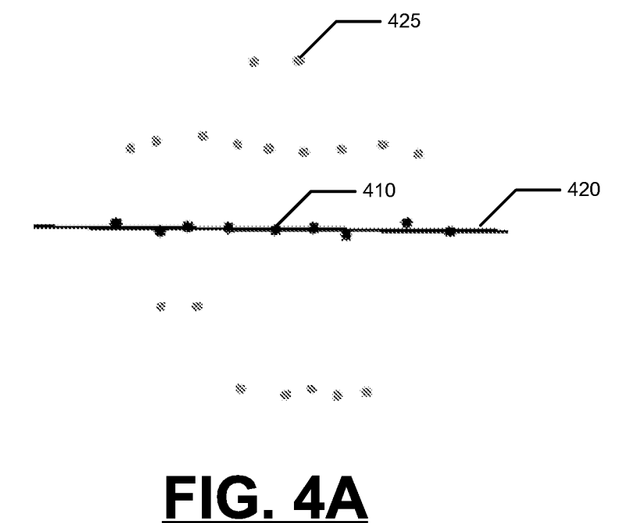
FIG. 4A illustrates an example of symbol centroids and local text line direction estimation, in accordance with some aspects of text line detection.

FIG. 4A illustrates an example of symbol centroids and local text line direction estimation, in accordance with some aspects of text line detection. FIG. 4A shows the symbols from FIG. 3 within the shaded local region reduced to centroids with centroid 410 representing the "o" 310 from FIG. 3. Line 420 is a local text line candidate and also represents the line in the local region corresponding to the symbol with centroid 410. Line 420 as illustrated here can be calculated by optimizing the cost function to determine the line that is closest to all the centroids in the local region. Darkened centroids along the line 420 belong to the line containing centroid 410. Centroid 425, on the other hand, is at the top of the figure and not on the line 420. After the cost function optimization process, the best value for the angle of line 420 is sloped slightly downwards, but is substantially horizontal.

Figure 4B:
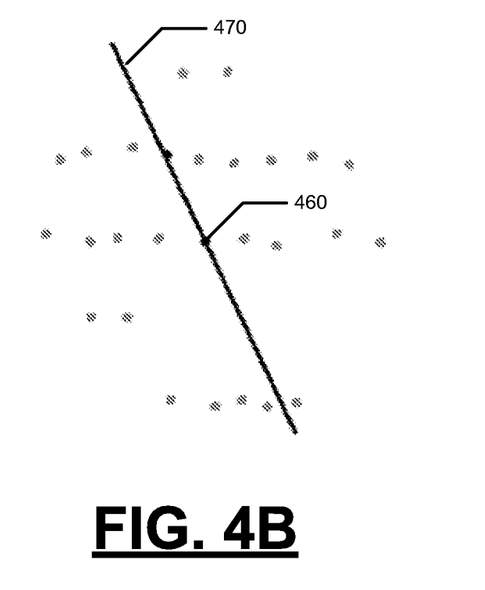
FIG. 4B illustrates a second example of symbol centroids and local text line direction estimation, in accordance with some aspects of text line detection.

FIG. 4B illustrates a second example of symbol centroids and local text line direction estimation, in accordance with some aspects of text line detection. Like FIG. 4A, the line 470 illustrated here is one of the local text line candidates for centroid 460. However, as can be seen, line 470 is less optimal compared to line 420 because line 470 is, on average, farther from the centroids in the local region. In some aspects, calculating which angle produces the optimal local text line candidate involves solving a cost function.

Figure 5:
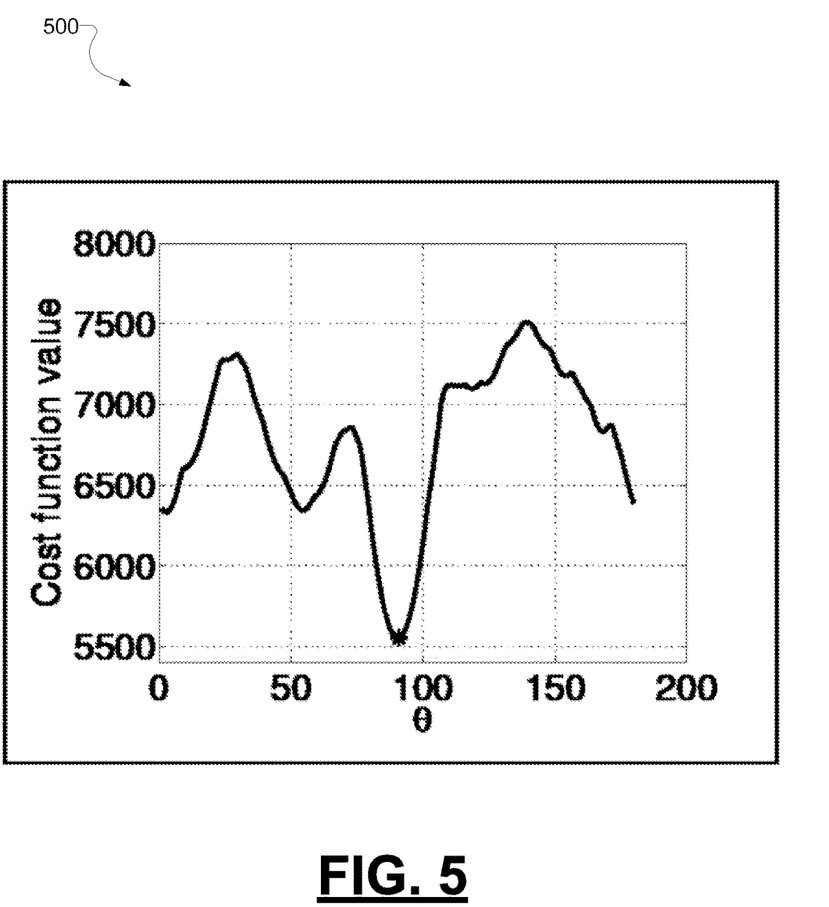
FIG. 5 illustrates an example line graph displaying cost values as a local line angle changes, in accordance with some aspects of text line detection.

FIG. 5 illustrates an example line graph 500 displaying cost values of all local text line candidates from 1 to 180 degrees for the local region depicted in FIGS. 3-4. As can be seen, the minimal and therefore optimized cost function value is at 90.6 degrees, which corresponds to line 420 from FIG. 4A.

Example Model

Figure 6:
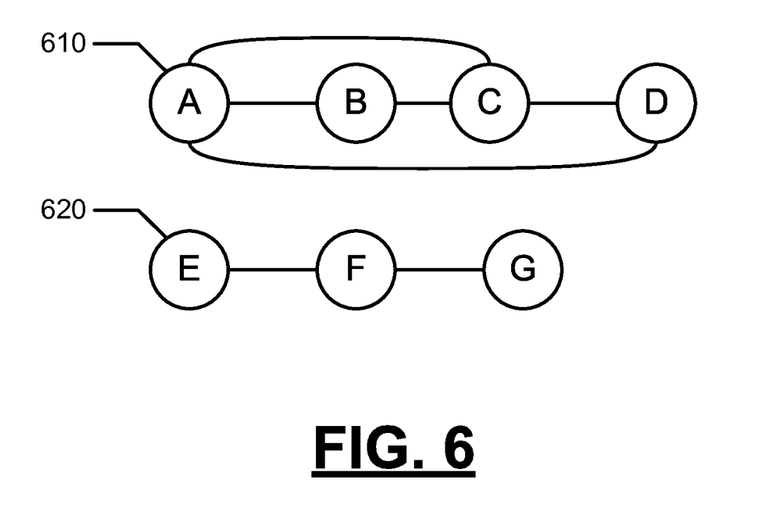
FIG. 6 illustrates an example partially connected graphical model, in accordance with some aspects of text line detection.

FIG. 6 illustrates an example partially connected graphical model showing two subgraphs, in accordance with some aspects of text line detection. In subgraph 610, node A is connected to nodes B, C, and D, meaning that B, C, and D belong to the same line in A's local region and vice versa. Note that node B is not connected to node D, although they are reachable from one another and therefore on the same text line. This could occur, for example, as a result of a non-uniform skew. Subgraph 620 depicts nodes E, F, and G forming a separate text line from subgraph 610.

Example Output

Figure 7:
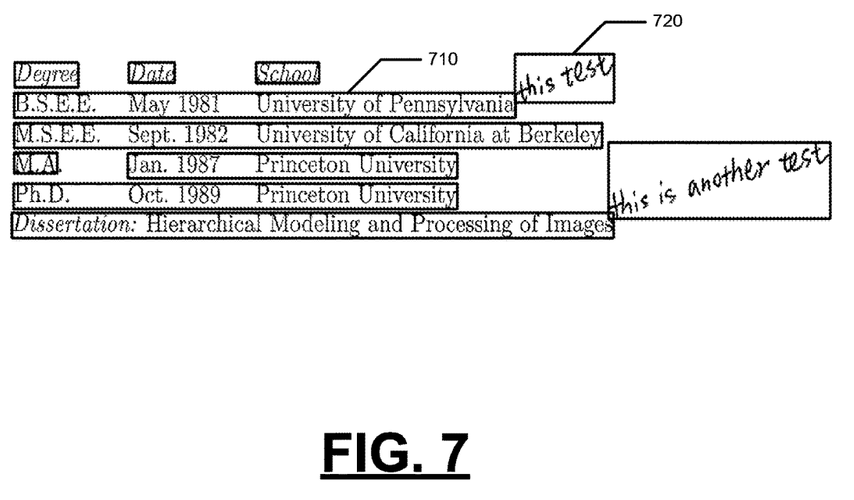
FIG. 7 illustrates an example of detected text lines, in accordance with some aspects of text line detection.

FIG. 7 illustrates an example of detected text lines, in accordance with some aspects of text line detection. In this example, text line detection 140 has taken an image of a scanned document and detected the text lines therein, marked in separate boxes for visibility. Text lines 710 and 720 are adjacent and skewed relative to each other. However, the procedure properly identified the two text lines as being distinct.

Figure 8:
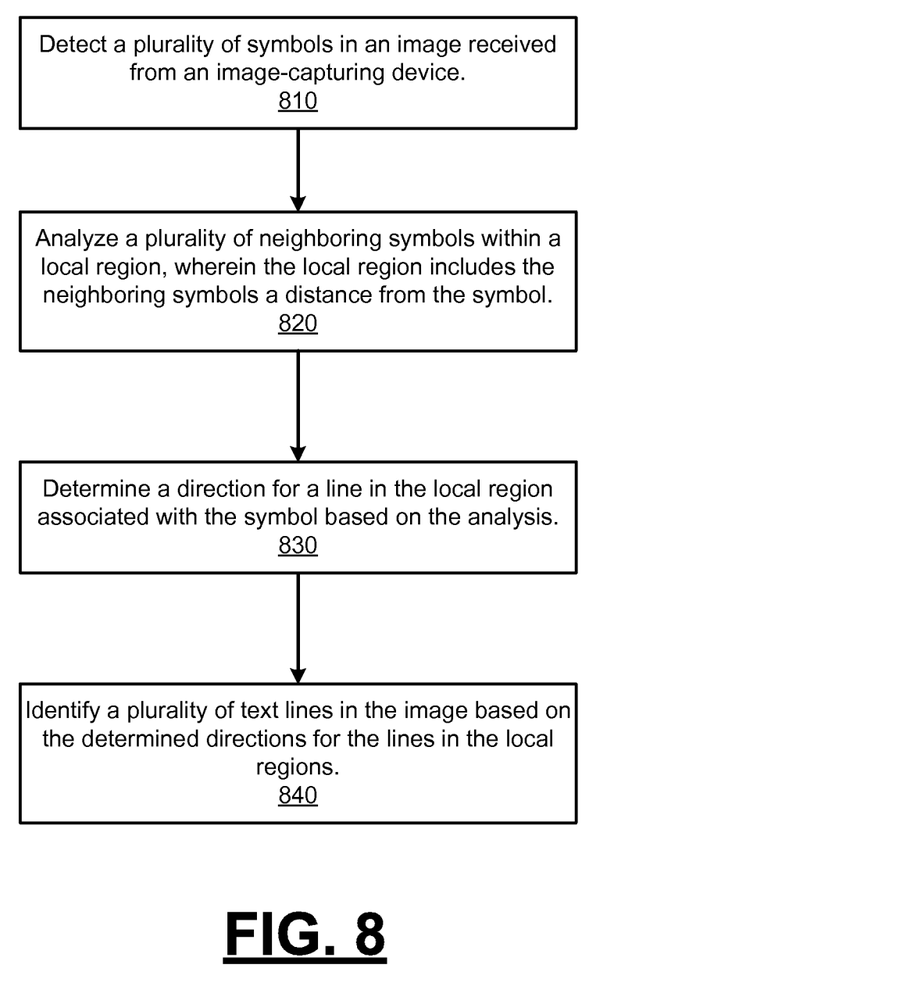
FIG. 8 illustrates an example method for text line detection, in accordance with some aspects.

FIG. 8 illustrates an example method for text line detection, in accordance with some aspects. In an aspect, symbol extractor 130 detects symbols in an image received from an image-capturing device (810). Local text line direction estimator 142 analyzes a plurality of neighboring symbols within a local region, wherein the local region includes the neighboring symbols a distance from the symbol (820). Local text line direction estimator 142 also determines a direction for a line in the local region associated with the symbol based on the analysis (830). Finally, graphical modeler 144 identifies a plurality of text lines in the image based on the determined directions for the lines in the local regions (840).

Computer System

Figure 9:
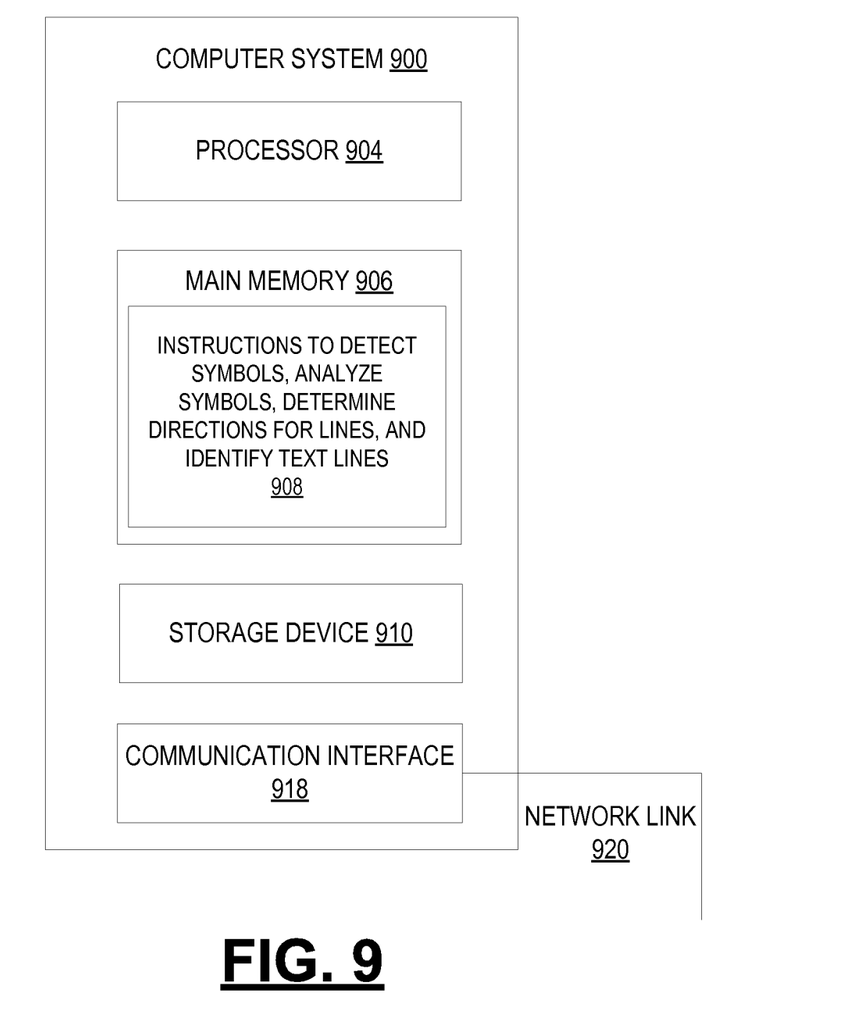
FIG. 9 is a block diagram that illustrates a computer system upon which examples described herein may be implemented.

FIG. 9 is a block diagram that illustrates a computer system upon which embodiments described herein may be implemented. For example, in the context of FIG. 1, system 100 may be implemented using one or more servers such as described by FIG. 9.

In an embodiment, computer system 900 includes processor 904, memory 906 (including non-transitory memory), storage device 910, and communication interface 918. Computer system 900 includes at least one processor 904 for processing information. Computer system 900 also includes the main memory 906, such as a random access memory (RAM) or other dynamic storage device, for storing information and instructions to be executed by processor 904. For example, main memory 906 can store instructions to detect symbols, analyze symbols, determine directions for lines, and identify text lines 908, in accordance with some aspects. Main memory 906 also may be used for storing temporary variables or other intermediate information during execution of instructions to be executed by processor 904. Computer system 900 may also include a read only memory (ROM) or other static storage device for storing static information and instructions for processor 904. The storage device 910, such as a magnetic disk or optical disk, is provided for storing information and instructions. The communication interface 918 may enable the computer system 900 to communicate with one or more networks through use of the network link 920 and any one of a number of well-known transfer protocols (e.g., Hypertext Transfer Protocol (HTTP)). Examples of networks include a local area network (LAN), a wide area network (WAN), the Internet, mobile telephone networks, Plain Old Telephone Service (POTS) networks, and wireless data networks (e.g., WiFi and WiMax networks).

Embodiments described herein are related to the use of computer system 900 for implementing the techniques described herein. According to one embodiment, those techniques are performed by computer system 900 in response to processor 904 executing one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In alternative embodiments, hard-wired circuitry may be used in place of or in combination with software instructions to implement embodiments described herein. Thus, embodiments described are not limited to any specific combination of hardware circuitry and software.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A text line detection system comprising:
    a memory resource to store instructions; and
    at least one processor to execute the instructions stored in the memory resource to:
    detect plurality of symbols in an image received from an image-capturing device;
    for each of at least some of the plurality of symbols:
        analyze a plurality of neighboring symbols within a local region, wherein the local region includes the neighboring symbols a given distance from the symbol; and
        determine a direction for a line in the local region associated with the symbol based on the analysis; and
    identify a plurality of text lines in the image based on the determined directions for the lines in the local regions, wherein identifying the plurality of text lines in the image based on the determined directions for the lines in the local regions further comprises:
        making a determination that a first symbol and a second symbol of the plurality of symbols are connected when the second symbol belongs to a first line associated with the first symbol, the first symbol belongs to a second line associated with the second symbol, and the angle between the first line and the second line is within a programmed threshold;
        modelling each symbol in the plurality of symbols as a node in a graph;
        connecting edges in the graph between nodes whose symbols were determined to be connected;
        marking all nodes in the graph as unclustered; and
        for each node in the graph and until all nodes are clustered;
    clustering the node with all other nodes in the graph reachable from the node according to the edges, wherein clustered nodes form text lines in the plurality of text lines in the image.

2. The system of claim 1, wherein determining the direction for the line in the local regions for each of the at least some of the plurality of symbols further comprises:
    optimizing a cost function using a plurality of local line candidates to determine the direction for the line in the local region, wherein each of the plurality of local line candidates passes through the symbol at a different angle.

3. The system of dam 1, further comprising:
    detecting non-symbol content contained in the image; and
    saving a document comprising the non-symbol content and the plurality of symbols arranged in the plurality of text lines.

4. The system of claim 1, wherein the plurality of text lines comprise the plurality of symbols in the image in a selectable text format.

5. The system of claim 1, wherein the image is in a binary format with no renderable text.

6. The system of claim 1, wherein the image-capturing device is a scanner or camera.

7. A method for text line detection, the method being executed by a computing device and comprising:
    detecting a plurality of symbols in an image received from an image-capturing device;
    for each of at least some of the plurality of symbols:
        analyzing a plurality of neighboring symbols within a local region, wherein the local region includes the neighboring symbols a given distance from the symbol;
        optimizing a cost function using, a plurality of local line candidates to determine a direction for a line in the local region, wherein each of the plurality of local line candidates passes through the symbol at a different angle; and
    identifying a plurality of text lines in the image based on the determined directions for the lines in the local regions, wherein identifying the plurality of text lines in the image based on the determined directions for the lines in the local regions further comprises:
        making a determination that a first symbol and a second symbol of the plurality of symbols are connected when the second symbol belongs to a first line associated with the first symbol, the first symbol belongs to a second line associated with the second symbol, and the angle between the first line and the second line is within a programmed threshold;
        modelling each symbol in the plurality of symbols as a node in a graph;
        connecting edges in the graph between nodes whose symbols were determined to be connected;
        marking all nodes in the graph as unclustered; and
        for each node in the graph and until all nodes are clustered:
            clustering the node with all other nodes in the graph reachable from the node according to the edges, wherein clustered nodes form text lines in the plurality of text lines in the image.

8. The method of claim 7, further comprising:
detecting non-symbol content contained in the image; and
saving a document comprising the non-symbol content and the plurality of symbols arranged in the plurality of text lines.

9. The method of claim 7, wherein the plurality of text lines comprise the plurality of symbols in the image in a selectable text format.

10. The method of claim 7, wherein the image is in a binary format with no renderable text.

11. The method of claim 7, wherein the image-capturing device is a scanner or camera.

12. A non-transitory computer-readable medium for text line detection, the computer-readable medium storing instructions that, when executed by at least one processor, cause the at least one processor to perform operations that include:
  detecting a plurality of symbols in an image received from an image-capturing device;
  for each of at least some of the plurality of symbols:
    analyzing a plurality of neighboring symbols within a local region, wherein the local region includes the neighboring symbols a distance from the symbol; and
    determining a direction for a line in the local region associated with the symbol based on the analysis;
  making a determination that a first symbol and a second symbol of the plurality of symbols, are connected when the second symbol belongs to a first line associated with the first symbol, the first symbol belongs to a second line associated with the second symbol, and the angle between the first line and the second line is within a programmed threshold;
  modelling each symbol in the plurality of symbols, as a node in a graph;
  connecting edges in the graph between nodes whose symbols were determined to be connected;
  marking all nodes in the graph as unclustered; and
  for each node in the graph and until all nodes are clustered:
    clustering the node with all other nodes in the graph reachable from the node according to the edges, wherein clustered nodes represent a plurality of text lines identified in the image.

13. The non-transitory computer-readable medium of claim 12, further comprising:
detecting non-symbol content contained in the image; and
saving a document comprising the non-symbol content and the plurality of symbols arranged in the plurality of text lines.

* * * * *

UNITED STATES PATENT AND TRADEMARK OFFICE
CERTIFICATE OF CORRECTION

PATENT NO. : 10,185,885 B2  
APPLICATION NO. : 15/521860  
DATED : January 22, 2019  
INVENTOR(S) : Peter Bauer et al.

Page 1 of 1

It is certified that error appears in the above-identified patent and that said Letters Patent is hereby corrected as shown below:

On the Title Page

In Column 1, in item (54), Title, Line 1, delete "TEX" and insert -- TEXT --, therefor.

In item (57), ABSTRACT, in Column 2, Line 1, delete "described" and insert -- described. --, therefor.

In the Specification

In Column 1, Line 1, delete "TEX" and insert -- TEXT --, therefor.

In the Claims

In Column 9, Line 44, Claim 1, after "detect" insert -- a --.

In Column 10, Line 19, in Claim 3, delete "dam 1," and insert -- claim 1, --, therefor.

In Column 10, Line 40, in Claim 7, delete "using," and insert -- using --, therefor.

In Column 12, Line 2, in Claim 12, delete "symbols," and insert -- symbols --, therefor.

In Column 12, Line 8, in Claim 12, delete "symbols," and insert -- symbols --, therefor.

Signed and Sealed this  
Nineteenth Day of November, 2019

Andrei Iancu  
*Director of the United States Patent and Trademark Office*